C. S. & J. A. CHALLINER.
PNEUMATIC TIRE FOR WHEELS.
APPLICATION FILED APR. 2, 1907.
906,487.
Patented Dec. 8, 1908.
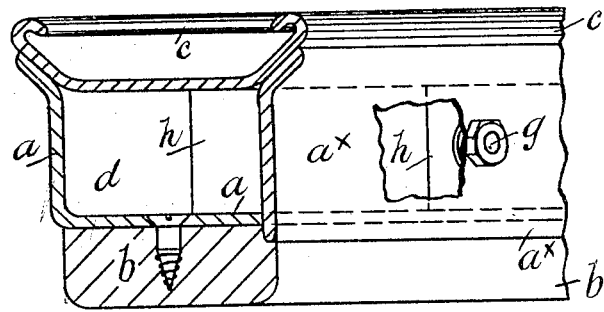
WITNESSES
Walter Abby
L. H. Grote
INVENTORS
Charles Smith Challiner
Joseph Albert Challiner
BY
Howson and Howson
ATTORNEYS

UNITED STATES PATENT OFFICE.

CHARLES S. CHALLINER AND JOSEPH A. CHALLINER, OF MANCHESTER, ENGLAND.

PNEUMATIC TIRE FOR WHEELS.

No. 906,487.      Specification of Letters Patent.      Patented Dec. 8, 1908.

Application filed April 2, 1907. Serial No. 366,020.

*To all whom it may concern:*

Be it known that we, CHARLES SMITH CHALLINER and JOSEPH ALBERT CHALLINER, subjects of the King of Great Britain and Ireland, and both residing at The Glen, Victoria Park, Manchester, in the county of Lancaster, England, have invented new and useful Improvements in or Relating to Pneumatic Tires for Wheels, of which the following is a specification.

The object of this invention is to provide a more ready method of attaching and detaching pneumatic or other tires to and from the wheels of motor cars or other vehicles, so that a permanent combined tire and rim may be carried.

We are aware that detachable tires and rims have been patented before, but our invention is an improved arrangement and combination designed to give great strength.

The figure in the accompanying drawing represents in vertical section and partly in perspective our improved construction.

For the purposes of our invention we employ angle rings or bands $a$ and $a^x$ with beveled flanges at the upper edges, on the wooden felly of the wheel for supporting the ordinary grooved metal rim $c$ in such a manner as to form a hollow inclosed chamber or channel $d$ between the rim $c$ and felly $b$ to receive the usual security bolts and wing nuts for holding the tire on the rim.

One of the angle rings $a$ may be fixed permanently to the felly $b$, the other or retaining band being loose and removable, as shown on the drawing, so that it can be readily fixed or detached by transverse bolts and nuts $g$ passing through the same in the usual manner and binding the whole together.

We use loose blocks H at intervals in the intervening space $d$, around the wheel for steadying the tire during the fixing process and adding rigidity to the rim, the bolts passing preferably through the blocks.

By our improved arrangement as shown and described we are enabled to carry an extra fully inflated tire and rim ready to be placed in position, on the wheel in case of puncture or accident, for permanent use, instead of having to deal with the usual emergency temporary wheel or tire sometimes carried.

We claim as our invention:

A tire rim support for wheels comprising an angle ring having a cylindrical part adapted to be fastened to the wheels and an angled extension adapted at its outer edge to support the tire rim, in combination with a ring adapted at its outer edge to support the tire rim and means to secure said latter ring to the angle ring to form a chamber to receive the usual security bolts for the tire and supporting blocks in said chamber between the rim and the angle ring.

In testimony whereof we have signed our names to this specification, in the presence of two subscribing witnesses.

CHARLES S. CHALLINER.
    JOSEPH A. CHALLINER.

Witnesses:
    JNO. HUGHES,
    J. ERNEST HUGHES.